United States Patent
Wong et al.

(10) Patent No.: US 12,450,259 B2
(45) Date of Patent: Oct. 21, 2025

(54) PERFORMANCE OPTIMIZATION IN RAFT-BASED ASYNCHRONOUS DATABASE TRANSACTION REPLICATION

(71) Applicant: Oracle International Corporation, Redwood Shores, CA (US)

(72) Inventors: Lik Wong, Palo Alto, CA (US); Sampanna Salunke, Dublin, CA (US); Leonid Novak, Castro Valley, CA (US); Mark Dilman, Sunnyvale, CA (US); Wei-Ming Hu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/805,383

(22) Filed: Aug. 14, 2024

(65) Prior Publication Data

US 2025/0094445 A1 Mar. 20, 2025

Related U.S. Application Data

(60) Provisional application No. 63/582,681, filed on Sep. 14, 2023.

(51) Int. Cl.
*G06F 16/00* (2019.01)
*G06F 16/27* (2019.01)

(52) U.S. Cl.
CPC .................... *G06F 16/273* (2019.01)

(58) Field of Classification Search
CPC ......................................... G06F 16/273
USPC ........................................ 707/610
See application file for complete search history.

(56) References Cited

U.S. PATENT DOCUMENTS

| | | |
|---|---|---|
| 10,936,573 B2 | 3/2021 | Ducott |
| 2004/0243558 A1 | 12/2004 | Nelson |
| 2005/0165858 A1 | 7/2005 | Tom et al. |
| 2010/0145909 A1 | 6/2010 | Ngo |
| 2013/0006933 A1 | 1/2013 | Holden |
| 2013/0290249 A1 | 10/2013 | Merriman et al. |
| 2014/0337529 A1 | 11/2014 | Antony |
| 2016/0371358 A1 | 12/2016 | Lee |

(Continued)

FOREIGN PATENT DOCUMENTS

| | | |
|---|---|---|
| EP | 1876788 A1 | 1/2008 |
| EP | 3182300 A1 | 6/2017 |
| WO | WO 2021/021757 A1 | 2/2021 |

OTHER PUBLICATIONS

"In Search of an Understandable Consensus Algorithm"; By: Diego Ongaro, Published 2014 https://www.usenix.org/system/files/conference/atc14/atc14-paper-ongaro.pdf (Year: 2014).*

(Continued)

*Primary Examiner* — Chelcie L Daye
(74) *Attorney, Agent, or Firm* — Hickman Becker Bingham Ledesma LLP; Stephen J. Walder, Jr.

(57) ABSTRACT

Replication is improved in a globally distributed database, such as a replicated sharded database, which uses raft-based asynchronous database replication. Improvements include Raft log persistence, coordination of followers' processing speed, transaction outcome determination, and column name compression, and improved failover time through heartbeat consolidation and keeping apply processes of followers running across failovers.

24 Claims, 9 Drawing Sheets

(56) References Cited

U.S. PATENT DOCUMENTS

| | | |
|---|---|---|
| 2017/0103092 A1 | 4/2017 | Hu et al. |
| 2018/0260125 A1* | 9/2018 | Botes ...................... G06F 3/067 |
| 2019/0155705 A1 | 5/2019 | Chavan |
| 2019/0163545 A1 | 5/2019 | Singh et al. |
| 2019/0325055 A1 | 10/2019 | Lee et al. |
| 2020/0034257 A1 | 1/2020 | Mahmood et al. |
| 2020/0364239 A1 | 11/2020 | Kumar |
| 2022/0100710 A1 | 3/2022 | Camargos et al. |
| 2022/0114058 A1 | 4/2022 | Mylavarapu et al. |
| 2022/0114164 A1 | 4/2022 | Krishnaswamy et al. |
| 2024/0045887 A1 | 2/2024 | VanBenschoten |

OTHER PUBLICATIONS

Ongaro et al., "In Search of an Understandable Consensus Algorithm", Jun. 19, 2014, pp. 1-16.

International Searching Authority, "International Search Report and Written Opinion", in International Application No. PCT/US2023/034464 dated Jan. 3, 2024, p. 14.

International Searching Authority, "International Search Report and Written Opinion", in International Application No. PCT/US 2023/034465 dated Jan. 9, 2024, pp. 13.

Cao et al., "PolarDB-X: An Elastic Distributed Relational Database for Cloud-Native Applications", 2022 IEEE 38th ICDE, pp. 1-14.

Ongaro, "In Search of an Understandable Consensus Algorithm", Published 2014 https://www.usenix.org/system/files/conference/atc14/atc14-paper-ongaro.pdf.

* cited by examiner

PERFORMANCE OPTIMIZATION IN RAFT-BASED ASYNCHRONOUS DATABASE TRANSACTION REPLICATION

CROSS-REFERENCE TO RELATED APPLICATIONS

This application claims the benefit of U.S. Provisional Application No. 63/582,681, filed Sep. 14, 2023, which is incorporated herein by reference in its entirety.

This application is related to U.S. application Ser. No. 18/227,288, filed Jul. 27, 2023, U.S. application Ser. No. 18/372,002, filed Sep. 22, 2023, U.S. application Ser. No. 18/372,005, filed Sep. 22, 2023, and to U.S. application Ser. No. 18/372,006, filed Sep. 22, 2023. Each of these related applications are incorporated herein by reference in their entirety.

FIELD OF THE INVENTION

The present invention relates to computing in distributed systems using relational databases and, more particularly, to performance optimization in asynchronous transaction replication in databases implementing the Raft algorithm.

BACKGROUND

Globally distributed database customers demand near-zero failover time, ideally 1 to 2 seconds. Some present-day systems implement a consensus-based replication with an average failover time of 3 seconds or more. The Raft algorithm is widely used for achieving consensus in distributed systems. Raft achieves consensus in a group of servers via an elected leader that is responsible for managing log replication on the other servers (followers). The leader accordingly can decide on the establishment of data flow between itself and the other servers. The leader regularly informs the followers of its existence by sending a heartbeat message; each follower has a timeout period in which it expects the heartbeat message from the leader. In a typical arrangement, a Raft heartbeat interval defaults to 500 ms, and the failure of a leader is noted after 6 missed heartbeat periods, resulting in 3 seconds for a new leader to be re-elected. Reducing these settings can cause leaders to unnecessarily ping-pong even for small network hiccups.

Using the Raft algorithm can present several performance challenges under real-world conditions. One challenge relates to coordination among followers in a Raft group, also referred to herein as a Replication Unit (RU). Followers may not consistently maintain the same speed of processing changes from the leader to replicate: occasionally, one might be slightly faster while at other times, slightly slower. It is challenging to ensure optimal performance while tolerating replicas or network failures. A common optimization is that the leader logs logical change records (LCRs) in an in-memory queue and sends them to each follower by a separate process (e.g., a network sender). A slower follower may be immediately detached from the in-memory queue whenever the lag of the slower follower impedes the enqueue of new LCRs. After detachment, the slower follower needs to read LCRs from a Raft log from persistent storage, which requires the slower follower to use a sub-optimal execution path, resulting in that follower falling further behind. Without detaching the slower follower, the faster follower is, in effect, throttled, impacting the replication performance and increasing user transaction response time. Furthermore, if the slower follower is down or isolated from the leader, the user transaction response time may increase unbounded.

Another challenge is when to issue an input/output (IO) instruction (e.g., "write,' "flush") to ensure durability for consensus. An LCR needs to be durably persisted in the majority of replicas for consensus. When the LCR persister receives an LCR (especially a commit LCR), an immediate IO write or flush may be inefficient if there are additional pending commit LCRs from the leader. A typical solution is to wait with a timeout before issuing the IO, resulting in time loss in the absence of pending commit records.

It is important for a leader to obtain consensus from the followers and communicate the consensus of a database transaction to the followers without delay. A typical approach is for the leader to send a pre-commit LCR to all followers for consensus. Once the consensus for the pre-commit LCR is obtained, this database transaction is deemed committed, which allows the leader to send a post-commit LCR in the same Raft log stream to all followers, communicating the consensus. The apply process in a follower cannot commit the replication of a database transaction until it has received the post-commit LCR. In rare cases, such as CPU contention in the leader when generating the post-commit LCR, a network hiccup, or memory pressure, the post-commit or rollback LCR for a transaction may be delayed. In those cases, an apply process may be ready to commit this transaction in the follower but has not received a post-commit LCR or "rollback LCR" within a specific time interval. Other apply processes must wait for this transaction to commit, particularly dependent processes, resulting in the further build-up of memory or falling back to disk. A separate data transmission of post-commit LCRs requires coordination between the regular LCR stream and post-commit LCR stream, violating a single Raft log stream assumption for transmitting transaction control LCRs and also increasing complexity. A separate post-commit LCR stream may also suffer from CPU contention, memory pressure, and network hiccups.

An LCR may represent a row change (insert, update, delete), and transaction directives, such as pre-commit, rollback, and partial rollback. Each row LCR may have multiple columns, even tens or hundreds. The lengths in the column names in a row LCR often vary and are long, which pose challenges in memory management, such as contention in allocation and de-allocation, and memory fragmentation. In addition, long column names consume more memory, storage, and network bandwidth. One solution (e.g., Oracle Logical Standby) is to map names to a number based on the database dictionary in the leader. Since the dictionary in the follower deviates from the leader, this requires populating the mapping, maintaining the mapping along with the LCR stream, and updating the mapping upon schema upgrade and leadership changes. Another approach is to use an off-the-shelf compression algorithm, which leads to trade-offs of CPU versus storage and network bandwidth.

DETAILED DESCRIPTION

In the following description, for the purposes of explanation, numerous specific details are set forth in order to provide a thorough understanding of the present invention. It will be apparent, however, that the present invention may be practiced without these specific details.

As used herein, the terms "Raft Group" and "Replication Unit" are understood to be synonymous, and the terms "Logical Change Records (LCRs)" and "Raft Log Records" are understood to be synonymous.

1. General Overview

In accordance with aspects of the disclosure, a computer-implemented approach is provided for improved replication in a globally distributed database, such as a replicated sharded database. The examples described herein relate to Raft-based database replications.

Aspects of the disclosure include improvements in Raft-based asynchronous database replication (RR); specifically, improvements in Raft log persistence, coordinating followers' processing speed, transaction outcome determination, and column name compression. Additional aspects of the disclosure include improved failover time via heartbeat consolidation and keeping apply processes of followers running across failovers.

2. Flow Control of Followers

Multiple followers inevitably run at different speeds at different times. An exemplary embodiment includes one leader and two followers. To avoid a slower follower ("lagging follower") falling too far behind, resulting in the slower follower reading from a persistent storage to catch up; the flow of LCRs to the faster follower is controlled using multiple techniques. This makes the system more stable yet allows failover if both followers drift beyond specification.

Figure 1:
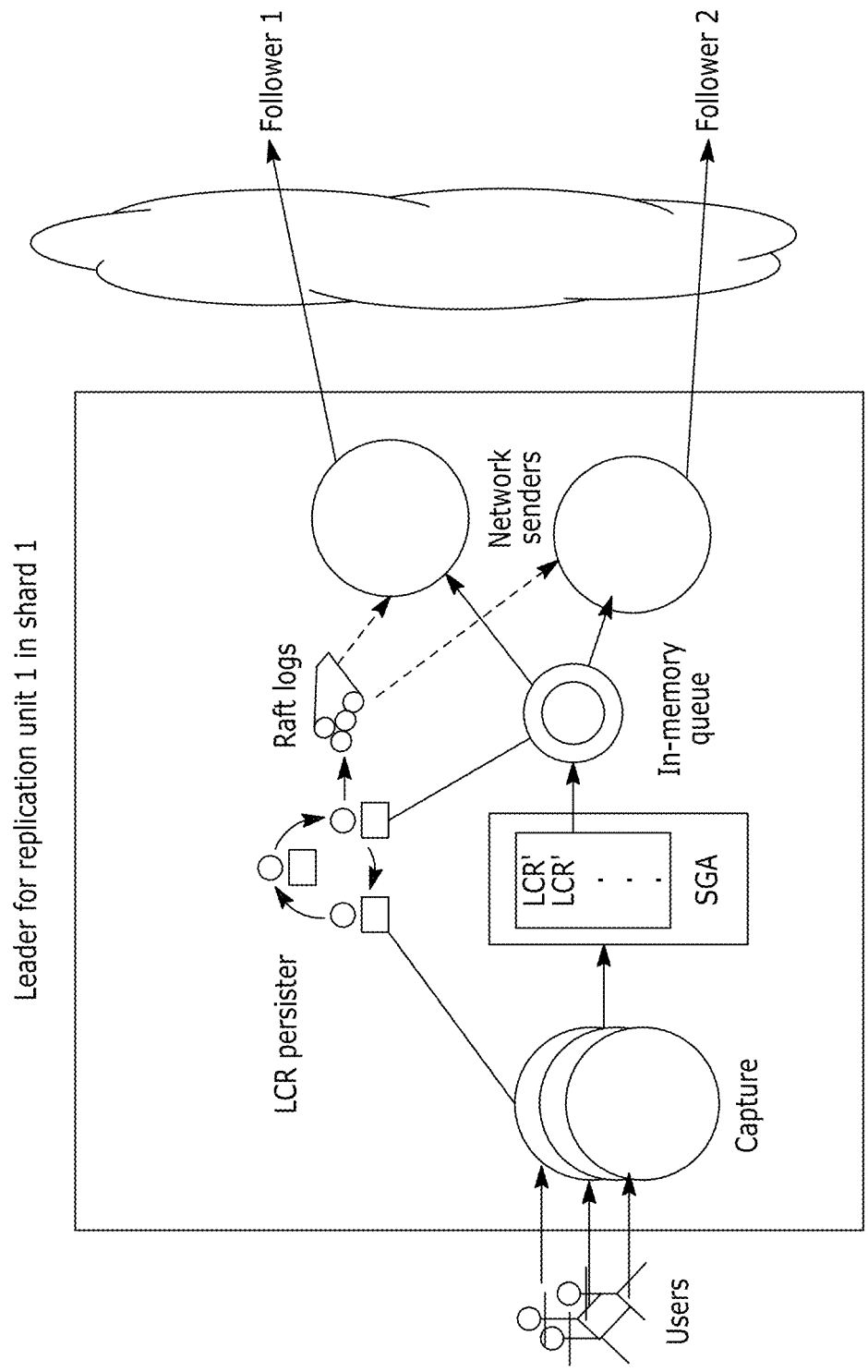
FIG. 1 schematically illustrates flow control of followers in a database implementing the Raft algorithm, in accordance with embodiments of the disclosure.

To explain how flow control of LCRs is managed and can affect overall system performance, a description of mechanisms involved in the processing of LCRs within a RU is useful. Referring to FIG. 1, LCRs are generated by capturing processes involved in executing database transactions on a leader. The LCRs are initially stored in a shared memory (SGA) and then added by an LCR producer (not shown) to a circular in-memory buffer. A respective network sender for each follower reads LCRs from the in-memory queue and sends LCRs to the follower. Each network sender sends LCRs to a network receiver hosted on a shard server hosting a corresponding follower. The network receiver stores the received LCRs in an in-memory queue.

An apply process (or processes) running on a follower applies the LCRs to the replication unit hosted by the follower. In addition, an LCR persister running on the shard server hosting each of the leader and followers reads LCRs from the in-memory queue and stores the LCRs at respective persistently stored Raft logs of the leader and followers.

A lagging follower is a follower whose respective network sender for the leader is reading LCRs from the in-memory queue at a rate slower than the network sender of another "faster" follower of the leader. In general, the number of LCRs in the in-memory queue that are unread by a lagging follower is greater than the number of LCRs in the in-memory queue that are unread by the faster follower. A lagging follower may cause the in-memory queue to accumulate with LCRs that are unread by the lagging follower to the point that the in-memory queue is relatively more frequently full with LCRs for a lagging follower over a period of time. As a result, the rate at which a faster follower reads LCRs is throttled because the faster follower must wait for the lagging follower to read and process LCRs to make room for new LCRs to be added by the capture processes. This effect is not limited to faster followers. Capture processes running within database transactions may be throttled by waiting for a lagging follower to read LCRs to make room within the in-memory queue to add new LCRs. The more often and/or longer a lagging follower lags, the periods of time in which the in-memory queue is full become more frequent and longer, and in turn, the more often a faster follower is throttled. In addition, overall system performance degrades. Even more, throttling a faster follower, in effect, throttles the process of reaching consensus on database changes to replicate within a replication unit, thereby degrading replication performance.

One measure to mitigate the impact of a lagging follower is to "detach" the follower. Detaching the follower entails removing the lagging follower as a subscriber of the in-memory queue, meaning the respective network sender of the lagging follower no longer reads records from the in-memory queue. Detaching the follower leaves the faster follower or followers as remaining subscribers, whose respective network senders remain readers of the in-memory queue. As a result, the remaining follower or followers are able to read and process LCRs more quickly and efficiently. Detaching the follower may also be referred to as detaching the network sender of the follower.

A drawback to detaching is that the flow of the LCRs to the lagging follower may even be further impeded. A detached follower may resort to obtaining LCRs from the persistently stored Raft log of the leader, resulting in a flow of LCRs to the follower that may be further impeded and a lag in replication that may be longer. For various reasons, a lag in replication to any follower may delay failover processing when a leader malfunctions.

Tuning flow control refers to measures taken to balance the flow of LCRs between faster followers and lagging followers to optimize various performance aspects of Raft based replication, including the performance of executing database transactions at the leader, replication of the respective changes to followers, and reduction of failover delay. In general, these measures entail (1) throttling a faster follower or (2) detaching a lagging follower depending on various criteria and conditions. Throttling refers to allowing a condition or entering a mode of execution where the likelihood that a faster follower is throttled by a lagging follower is greater than what otherwise exists without a lagging follower. For example, the in-memory queue becomes full for a lagging follower as the lagging follower has not consumed any LCRs in the in-memory queue. On the other hand, the in-memory queue is not full for a faster follower, which has consumed some LCRs in the in-memory queue. When a faster follower is throttled, there are no more available LCRs in the in-memory queue for the faster follower. In other words, the in-memory queue is empty for a throttled faster follower.

There are multiple techniques to tune the flow control, as described below:

(1) AT_DISTANCE: As long as the lagging follower is within a threshold distance (in terms of the number of LCRs) from a faster follower, the fast follower is throttled. However, if the lagging follower falls behind by more than the threshold distance, then it is detached, at which point it may or may not be able to catch up, depending on the reason for the lag. For example, if the lagging follower is lagging because of a poor network connection it will be disabled in the replication group when the needed LCRs are no longer available in the leader. This is also the case if a follower is down.

(2) TILL_TIMEOUT: As long as the lagging follower has received an LCR within a threshold time, the faster follower is throttled. However, if the lagging follower falls behind by more than the threshold time, then it is decoupled, at which point it may or may not be able to catch up, depending on the reason for the lag.

(3) AT_LOGLIMIT: When the leader needs to overwrite a log file that is still required by a lagging follower, the leader waits for the lagging follower to consume the LCRs in the Raft log. If the lagging follower is down, the leader waits for the lagging follower to come online.

Figure 2:
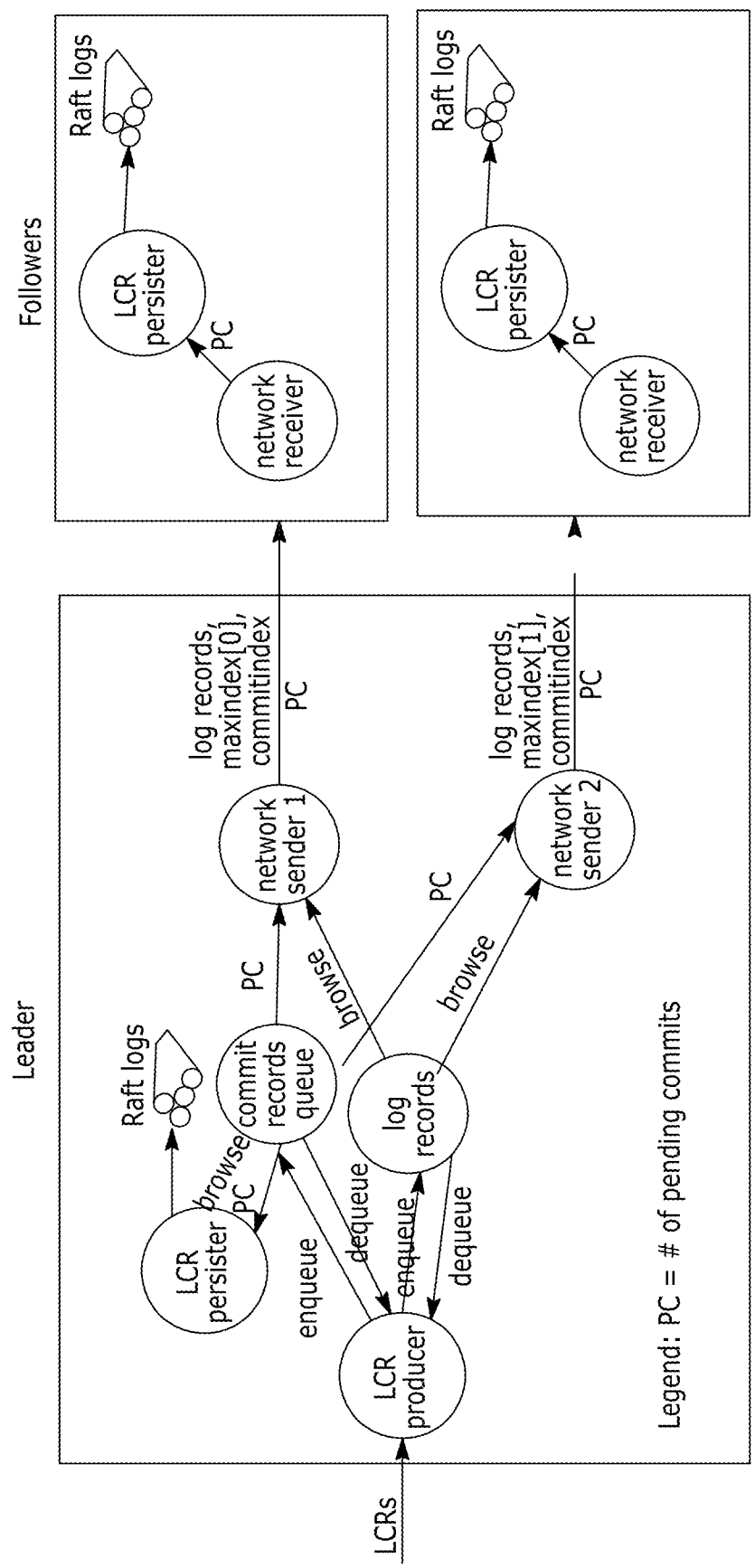
FIG. 2 schematically illustrates Raft log persistence optimization, in accordance with an embodiment of the disclosure.

Refer to FIG. 2 to compute AT_DISTANCE in percentage. The LCR persister and network senders are the subscribers of the in-memory queue. Whenever the LCR producer cannot enqueue into this queue (full queue), it computes the available (unconsumed) items for the fast (fast_follower_avail_items) and slower followers (slow_follower_avail_items), and the distance between them distance=(slow_follower_avail_items−fast_follower_avail_items).

If (distance/max_queue_capacity)*100>specified AT_DISTANCE, the LCR producer detaches the lagging follower as the subscriber from the queue if there are still enough followers for consensus.

The lagging follower falls back to reading Raft logs in persistent storage. Once the lagging follower is close to catching up with the most recent LCRs, it sends a request to join back as a subscriber of the in-memory queue.

TILL_TIMEOUT can be implemented similarly as above: if (time_current_time_ms−slow_follower_last_network_sent_time_mis)>specified TILL_TIMEOUT (in millisecond), the LCR producer removes the lagging follower as the subscriber from the queue if there are still enough followers for consensus.

AT_LOGLIMIT: when the LCR persister in the leader needs to write a set of LCRs into the Raft log: (1) determine the log file of the Raft log to which to write; (2) compute the minimum required log index for all followers; (3) if the minimum required log index is in the selected log file and it is not allowed to allocate new storage, the LCR persister waits until this condition is false.

The AT_DISTANCE and TILL_TIMEOUT techniques are examples of the application of throttling criteria and detaching criteria. In response to determining or detecting that throttling or detaching criteria are satisfied, a faster follower is throttled and/or a lagging follower is detached, respectively. For example, in the AT_DISTANCE technique, being below or no greater than a threshold distance is an example of meeting a throttling criterion, and being at or greater than a threshold distance is an example of meeting a detaching criterion.

3. Raft Log Persistence Optimization

RR leverages the pending commit LCRs in an in-memory "commit queue" at the leader to minimize the LCR persister's IO flush in the leader and its followers. Each entry in a commit queue corresponds to a database transaction and there is no more than one entry per database transaction. A leader enqueues an entry for a database transaction into the commit queue when it processes a "pre-commit LCR" for a database transaction. When a follower persists a pre-commit LCR, the follower sends back an acknowledgment to the leader, which determines whether consensus for the database transaction has been reached, and, if so, notifies the foreground process for the database transaction, thereby allowing the foreground process to return the control to the user.

The network sender in the leader peeks into the commit queue for the number of pending commits and sends the number of pending commits to the network receiver. The network receiver relays the number of pending commits to the LCR persister, which allows the LCR persister to minimize flushing to persistent storage. The LCR persister for the leader also uses the pending commit LCRs to guide when to write and flush its IO operations.

RR communicates the number of pending commit LCRs at the leader when sending LCRs to its followers, which allows the follower's LCR persister to batch writes of multiple commit LCRs without a typical inefficient timeout mechanism. The same applies to the LCR persister in the leader.

Referring to FIG. 2, network senders for the leader peek into the commit record queue to find out the number of pending commits and relay the number of pending commits to the followers along with the regular LCR stream, which use this information to batch IO writes to Raft logs without wasted timeout. The LCR persister also uses the number of pending commits to guide its write and flush to IO.

4. Transaction Outcome Determination Pending Receipt of Post-Commit LCR

If an apply process of a follower has not received the post-commit LCR for a transaction after a specific timeout, it calls an RPC (remote procedure call) to the leader to determine the transaction outcome. Once the apply process learns the outcome of this transaction, it can commit or roll back this transaction, freeing relevant in-memory LCRs and allowing other apply processes to proceed. This removes the build-up in the replication pipeline when there are resource contentions, such as CPU, memory pressure, and network congestion. In 99+% cases, apply processes receive the post-commit LCRs before the specified timeout. Hence, the apply processes rarely invoke the more costly RPC, which in the steady state pose no performance impact.

Apply processes in RR can call an RPC to the leader to determine the outcome (committed, rollbacked, or active) when the relevant post-commit LCRs have not been received within a specified time interval to resolve this bottleneck in the replication pipeline. Each LCR contains sufficient information to identify a transaction in the original leader, such as a transaction ID, a reset log system change number, e.g. system change number ("SCN"), a transaction start system change number, and so on.

Figure 3:
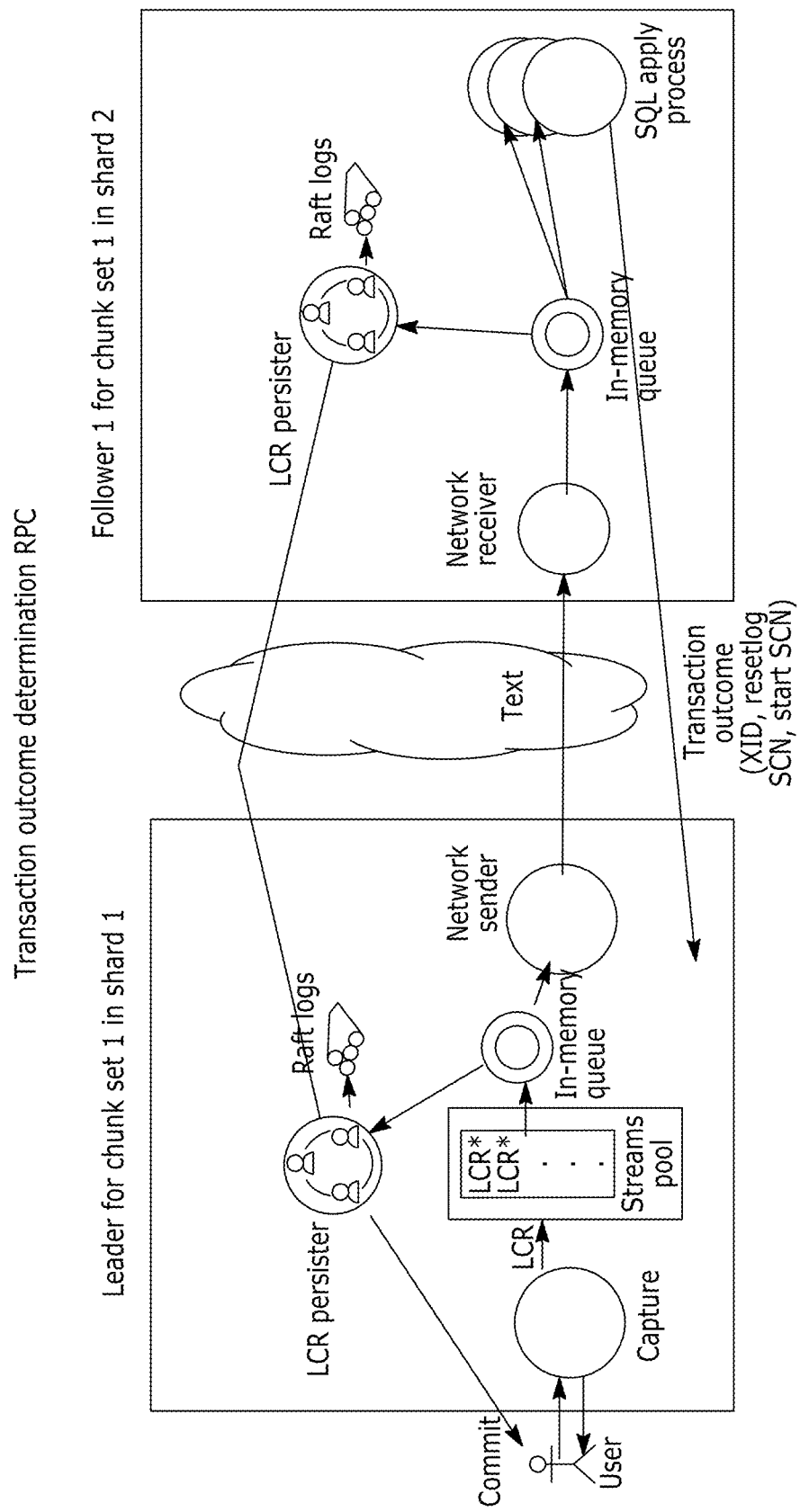
FIG. 3 schematically illustrates a procedure for transaction outcome determination, in accordance with an embodiment of the disclosure.

In FIG. 3, there might be a delay in generating the post-commit LCR in the leader due to CPU contention, a delay in sending this LCR due to memory pressure, or a network hiccup. Apply processes in the follower eagerly execute replicated database transactions in the database without waiting for a pre-commit or post-commit LCR for the database transactions. When a follower is ready to commit and the post-commit or rollback LCR has not been delivered after a specific timeout, the follower makes an RPC call to the leader to find out the outcome of such a transaction, supplying the transaction identification, such as the transaction ID, reset log SCN, start SCN, and so on. Multiple such RPCs around the same time can be batched to reduce the network overhead. If there are connection errors to the leader, the apply process continues to wait with a larger timeout as the connection errors may indicate that the leader might have failed, and the post-commit or rollback LCR will be delivered via the regular LCR stream.

5. Column Name Compression

RR compresses an arbitrary long column name to a small, fixed length, e.g., hashes a column name with more than a four-byte length to a four-byte value. This eliminates contention and memory fragmentation in allocating column names and achieves the optimum compression ratio, leading to memory, storage, and network bandwidth savings in LCRs. The leader computes hash values for the column names, caches the column name and hash value mapping, and uses the hash value as the column name in the LCRs. The follower also produces column name and hash value mapping using the same hash algorithm as the leader for each table and gets the column name based on the hash value in the LCR. The optimization is disabled for a column upon a hash collision.

Using hash to compress arbitrarily long column names to small and fixed bytes yields optimal column name compression in terms of memory, CPU, storage, and network bandwidth consumption.

Figure 4:
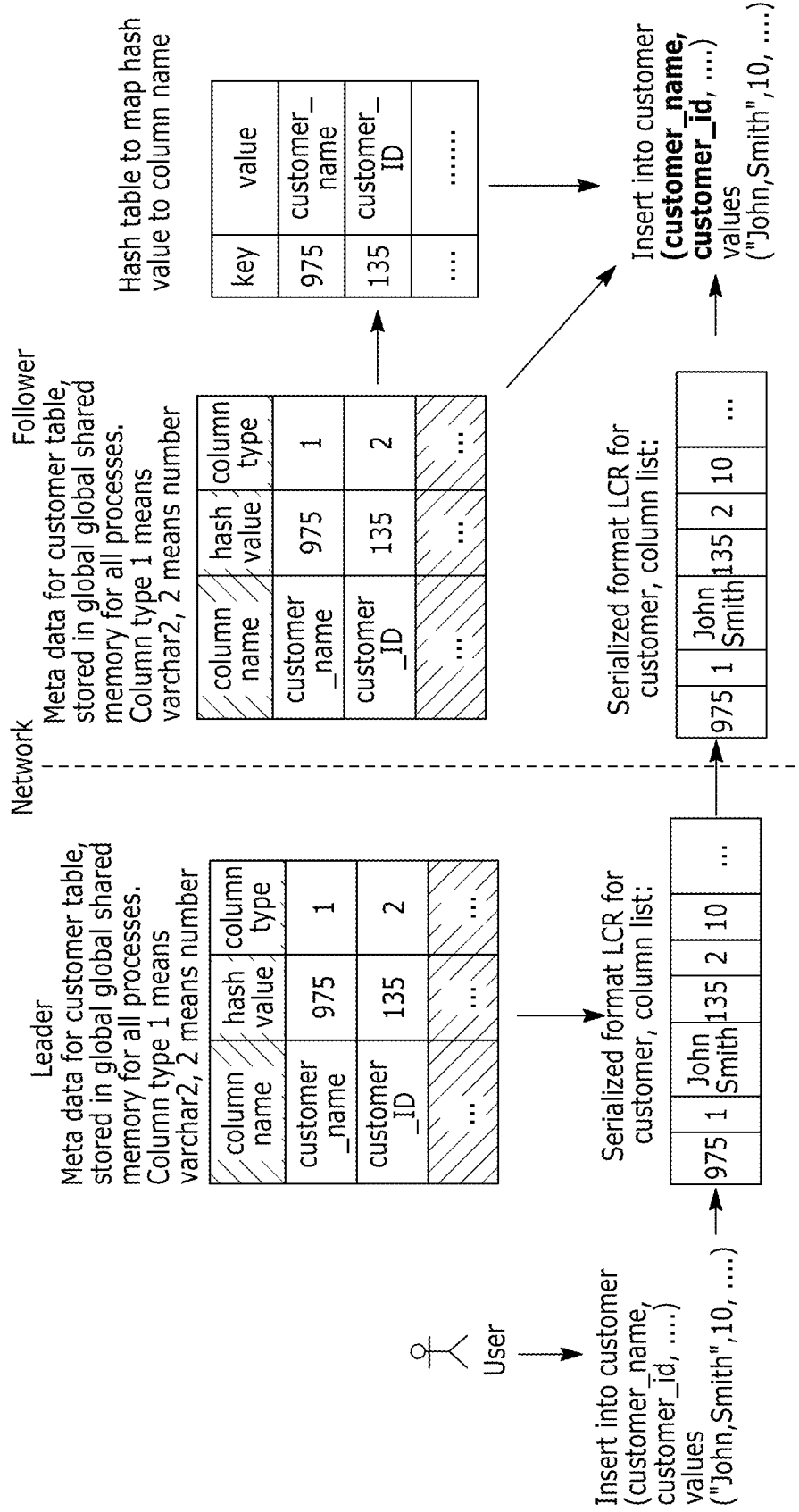
FIG. 4 schematically illustrates a column name compression procedure in accordance with an embodiment of the disclosure.

Considering FIG. 4, both the leader and followers cache table metadata in global shared memory (SGA) for access from multiple apply processes. RR includes a hash value for each column in the absence of a hash collision using the same hash algorithm in all replicas. The leader uses hash values instead of the column names in the LCR. Once the follower receives the LCR in serialized format, it looks up the column name based on the hash value in the LCR and constructs the proper SQL statement for execution. To allow heterogeneous endianness between the leader and followers, RR uses the byte-sortable representation of the hash values.

6. Optimized Fast Failover in Sharded DBMS

In an embodiment, RR is used for replication in a replicated sharded DBMS. In a replicated sharded DBMS, a sharded database is replicated among database servers ("shard servers") of the replicated DBMS. A replicated sharded DBMS that employs RR is described in U.S. application Ser. Nos. 18/372,002, 18/372,005, and 18/372,006, which were referenced above.

In an embodiment, a sharded database is divided into units referred to as chunks. Each chunk includes one or more partitions from of one or more database objects. The partitions of a database object may reside in respective chunks.

In a replicated sharded DBMS, each replica of a shard comprises replicas of chunks. Chunks are organized into replication units (RU). An RU includes a set of chunks that are replicated across a set of shard servers. Each RU has a single leader and a set of followers. The leader makes changes to respective chunk replicas hosted at the leader; the followers replicate the changes by applying the changes to respective chunk replicas. For the partitions of a given database object, the partitions may be replicated across multiple RUs, with subsets of the partition being changed by a different leader.

Figure 5:
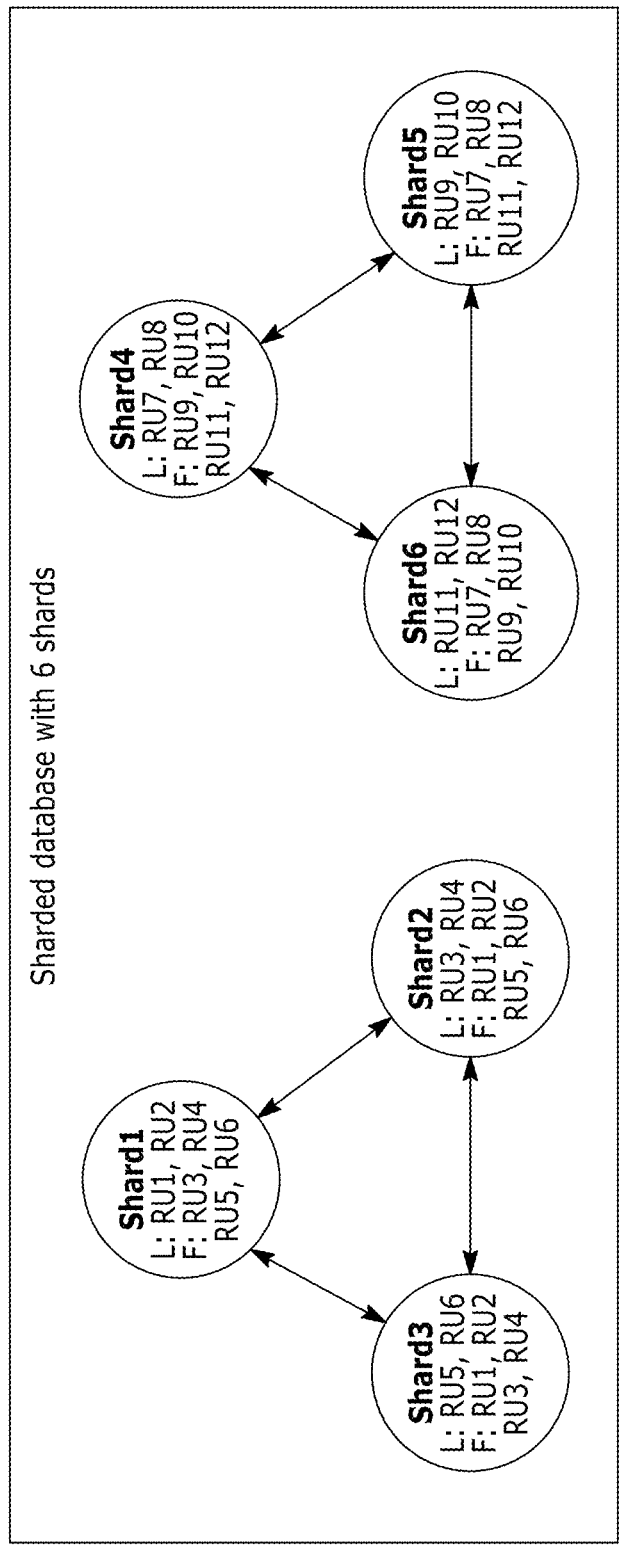
FIG. 5 is a schematic illustration of a sharded database with shards organized according to rings, in accordance with embodiments of the disclosure.

A set of RUs may be hosted across a "ring" of shard servers. Each shard server in the ring may be a leader of a subset of the set of RUs, with other shard servers in the ring being followers for the subset. For example, FIG. 5 illustrates a sharded database with six shards organized according to two rings: (1) Shard1, Shard2, Shard3, and (2) Shard4, Shard5, Shard6. Each shard has a leader (L) and follower (F) replication units (RUs). Prior solutions for failover in a replicated sharded DBMS typically achieve 3 seconds or more failover time. RR can achieve lower than 3 seconds, depending on network latency. Firstly, RR consolidates heartbeats to reduce heartbeat overhead in idle and moderate user workloads. RR defaults the heartbeat interval to 150 ms; secondly, the network receiver in a follower in RR may temporarily detach from apply processes for faster failover and LCR persistence; thirdly, RR keeps apply processes running during failover to reduce the failover time, i.e., avoiding restart of an apply process.

RR consolidates heartbeats across replication units in a set of shard servers, such as shard servers in a ring, in low and moderate workloads.

In addition, the network receiver may temporarily detach from the apply processes for faster LCR persistence and failover. The apply process reads from persistently stored LCRs from a Raft log in the interim and attaches to the in-memory queue when the process is close to catching up.

Furthermore, RR avoids restarting the apply processes when a follower becomes the new leader during failover, or a follower joins a new leader. Stopping and restarting multiple apply processes may take an unpredictable amount of time, especially in a loaded system. This may reduce the failover time. When the follower needs to delete Raft log entries, and the follower's network receiver has already forwarded those LCRs to apply processes, the will request the apply processes to roll back relevant transactions and free those LCRs.

RR consolidates heartbeats to minimize heartbeat overhead, especially in idle or moderate workloads.

Each network sender for an RU leader stores liveness data in a shared global memory area (SGA), e.g., RU[ ].Network_sender_Liveness[ ], by updating it periodically (e.g., slightly less than the specified heartbeat interval), RU[i] stores an RUI's liveness data in SGA.

The network sender also maintains the most recent time it has sent LCRs to the network sender's follower in the SGA variable RU[ ].follower_last_sent_time[ ].

A single designated heartbeat process in a shard server reads RU[ ].Network_sender_Liveness[ ] and RU[ ].follower_last_sent_time[ ], and decides if the designated heartbeat process needs to send consolidated heartbeats for a destination (target shard) as follows:

If RU[i].Network_sender_Liveness[j] has not been updated within the specified time, the designated heartbeat process does not include this follower in its next heartbeat as the corresponding RU is not healthy. The corresponding follower may timeout and start the RU leader election.

Otherwise, if RU[i].follower_last_sent_time[j] has been updated with the specified time, it does not include this follower in its next heartbeat, as there were LCRs sent to this follower within the heartbeat interval. The consolidated heartbeats are skipped if no followers need heartbeats in a destination shard.

Otherwise the designated process includes this follower for its next heartbeats to the given destination as this RU is healthy with idle or a moderate workload.

Figure 6:
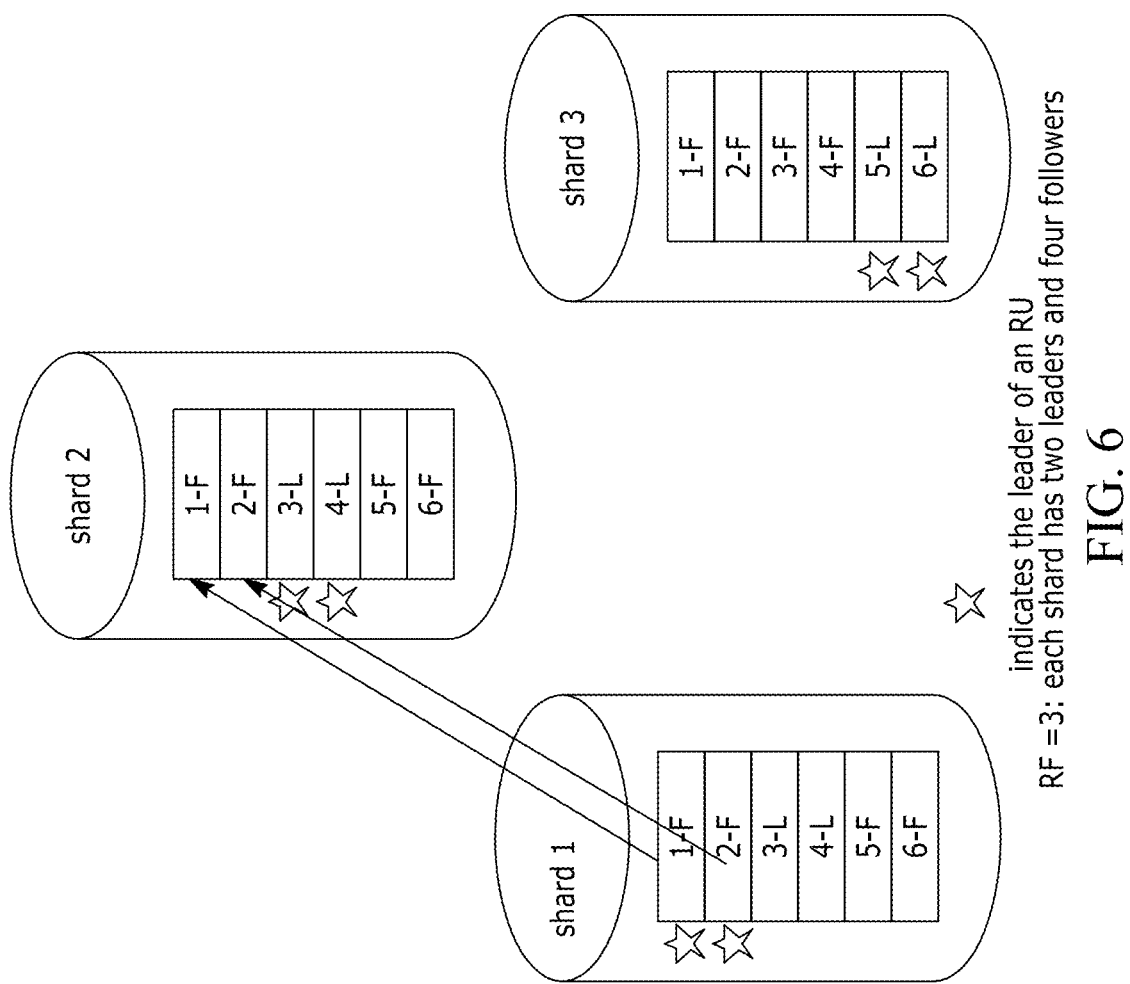
FIG. 6 schematically illustrates a sharded database in which Raft-based asynchronous database replication is performed, in accordance with embodiments of the disclosure.

The heartbeat receiver unpacks a consolidated heartbeat message and relays it to each follower RU in the shard. Considering FIG. 6, RR consolidates heartbeats from RU 1 and RU 2 in shard 1 to shard 2. Since RR groups many chunks into one Replication Unit, there are fewer replicas in a shard, which simplifies the heartbeat consolidation.

In addition, RR leverages heuristics discussed in the "Keeping Stable Leadership In Raft-based Protocol with Fast Automatic Failover" patent application to keep the leadership stable, even in the presence of small network hiccups. For example, a follower rejects a vote request if it receives a heartbeat from the leader within the heartbeat interval.

Figure 7:
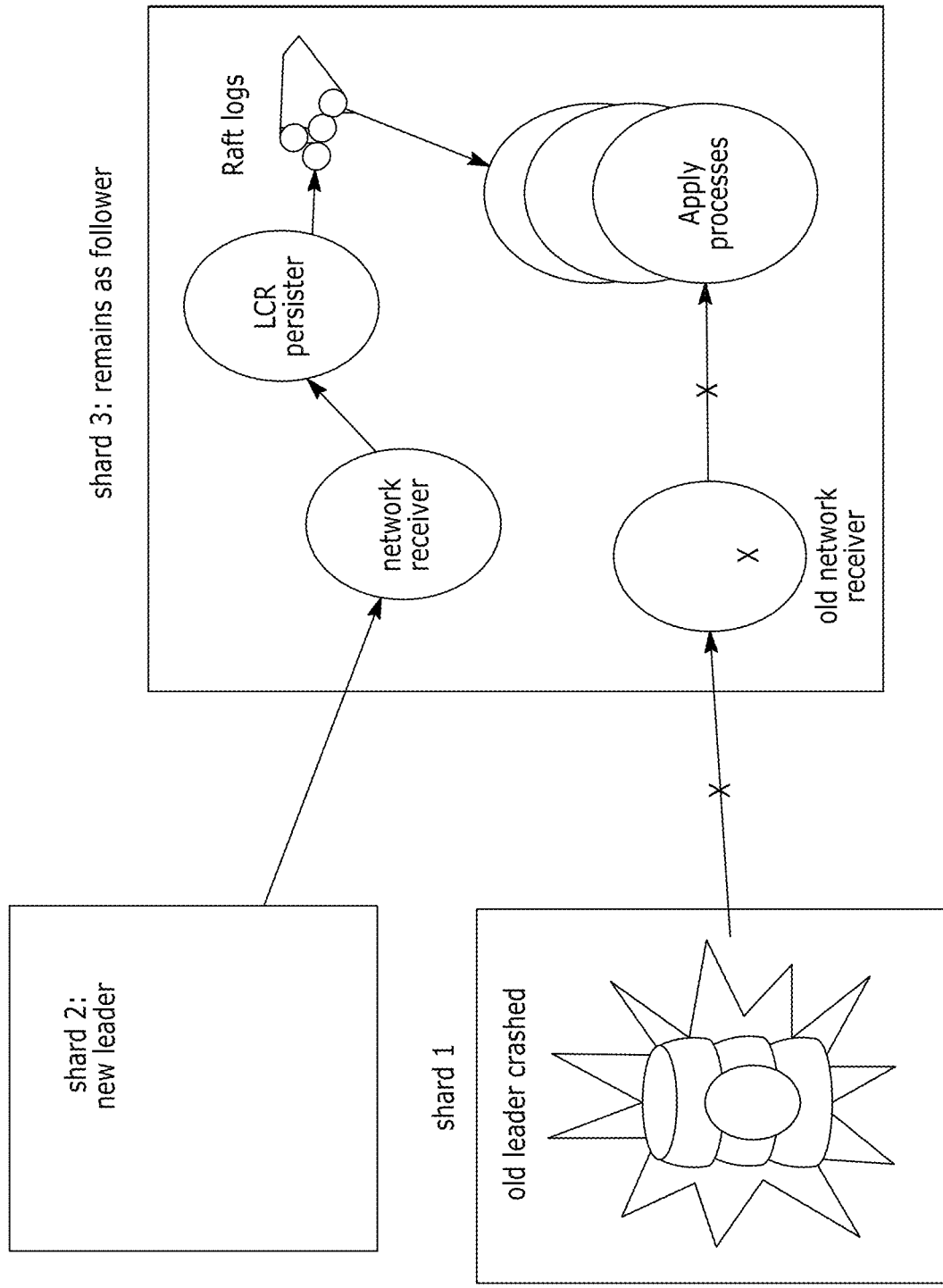
FIG. 7 schematically illustrates a failover procedure according to embodiments of the disclosure.

Temporary detaching of the Network Receiver from its Apply to speed up the failover is described with reference to FIG. 7:

(1) The old leader in shard server 1 crashes, leading to errors in the old network receiver in shard server 3, which detaches from the Apply.
(2) Shard server 2 becomes the new leader after the election and connects to shard server 3, who remains a follower. A new network receiver in shard 3 is spawned upon the new leader shard 2's connection.
(3) The new leader sends a no-op commit LCR (LEAD-SYNC) to its follower shard server 3. This causes the follower shard server 3 to synchronize its copy of the Raft log, ensuring that shard server 3 has the current log files and LCRs of the Raft log of the shard server 2. Shard server 2 does not open up for workload (i.e., DML changes) before the synchronization is complete.
(4) To minimize any delay in acknowledging the new leader's LEAD-SYNC LCR and receiving any older LCRs, the network receiver in shard server 3 only forwards LCRs to the LCR persister and temporarily stops sending LCRs to the apply process on the follower. This facilitates a faster failover.
(5) In lieu of receiving LCRs from said network server, the apply process reads LCRs from the persistently stored local Raft log of the follower to catch up in the interim.
(6) Once the failover completes and the apply process is close to catching up, the network receiver starts forwarding received LCRs to the apply process on the follower.

There are two cases to consider when keeping the apply process running during failover:

(1) If a follower becomes the leader, the new leader ensures that all committed transactions from the old leader need to be applied locally first before opening for the user workload (e.g. DML changes), which requires work by the apply processes. Before gaining the leadership, apply processes may already have executed the prefix of some transactions that need to be committed. Restarting the apply processes will lose that work. In addition, restarting multiple apply processes may take an unpredictable amount of time, especially in a loaded system. Hence, it is advantageous to keep an apply process running rather than restarting across a failover to reduce the failover time. It is straightforward to keep the apply running on the new leader.
(2) If a follower remains as a follower, its network receiver may have sent LCRs to the respective local apply process, which may have started applying the LCRs eagerly, requiring that those LCRs be truncated from the Raft log. To avoid restarting the apply process, the network receiver requests that the apply processes purge all LCRs above a given log index and that the apply processes roll back in-progress transactions having LCRs above the given log index. Once the Apply processes complete the above, the network receiver resumes delivering new LCRs to the apply process.

7. DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically marked data objects; however, the hierarchically marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, a branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running software of a particular database server. Each combination of the software and allocation of resources from a node is a server that is referred to herein as a "server instance" or "instance." A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the arguments of the procedure and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e., .java file) and the compiled version of the class (i.e., .class file).

A database object may have an attribute that is a primary key. A primary key contains primary key values. A primary key value uniquely identifies a record among the records in the database object. For example, a database table may include a column that is a primary key. Each row in the database table holds a primary key value that uniquely identifies the row among the rows in the database table.

A database object may have an attribute that is a foreign key of a primary key of another database object. A foreign key of a primary key contains primary key values of the primary key. Thus, a foreign key value in the foreign key uniquely identifies a record in the respective database object of the primary key.

A foreign key constraint based on a primary key may be defined for a foreign key. A DBMS ensures that any value in the foreign key exists in the primary key. A foreign key need not be defined for a foreign key. Instead, a foreign key relationship may be defined for the foreign key. Applications that populate the foreign key are configured to ensure that foreign key values in the foreign key exist in the respective primary. An application may maintain a foreign key in this way even when no foreign relationship is defined for the foreign key.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
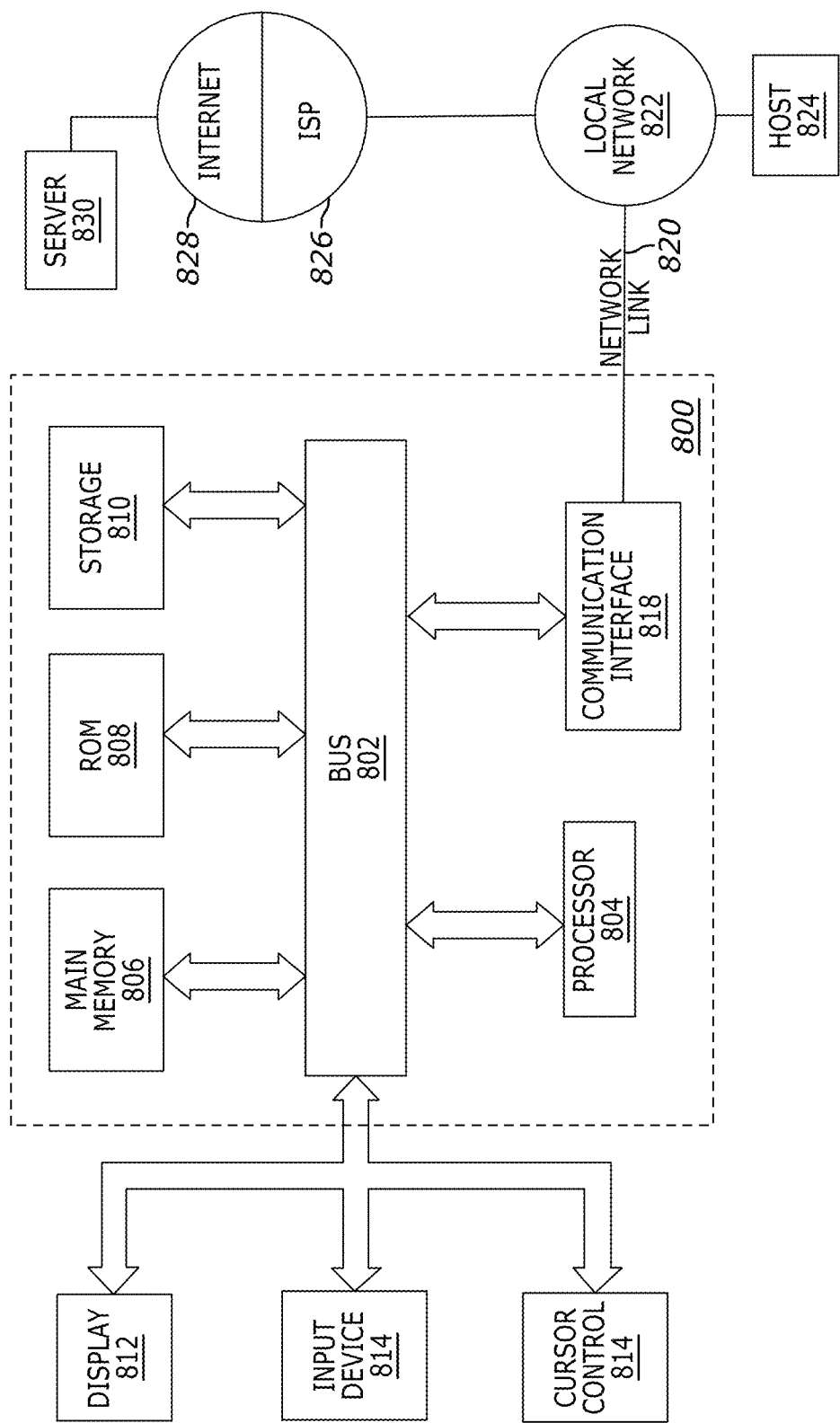
FIG. 8 is a block diagram that illustrates a computer system upon which an embodiment of the invention may be implemented.

For example, FIG. 8 is a block diagram that illustrates a computer system 800 upon which various embodiments of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

9. Software Overview

Figure 9:
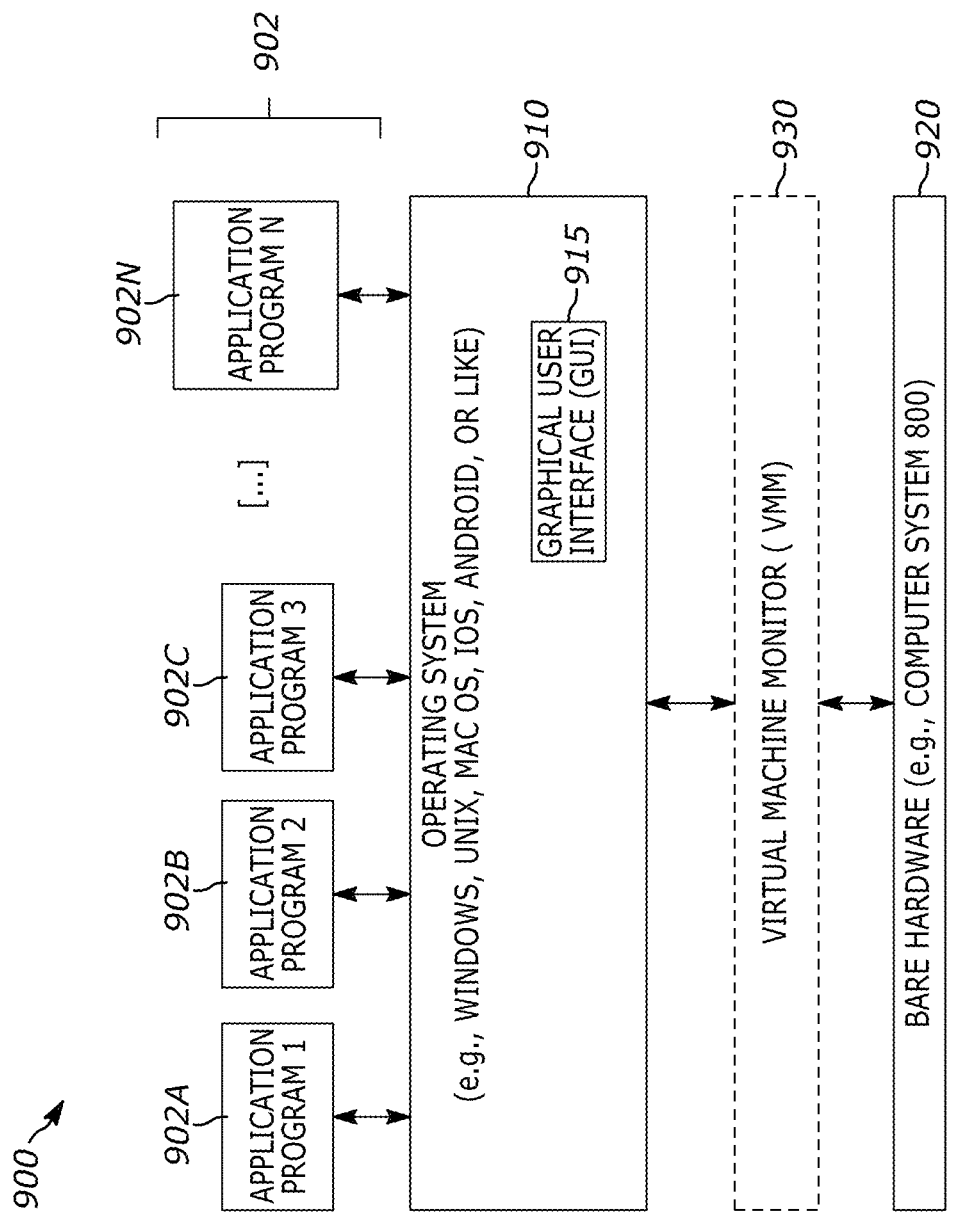
FIG. 9 is a block diagram of a basic software system that may be employed for controlling the operation of a computer system upon which an embodiment of the invention may be implemented.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

10. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
within a replication group that replicates a replication unit of a database, a leader for said replication unit sending via an in-memory queue a stream of LCRs (Logical Change Record) to a plurality of followers for said replication unit, wherein LCRs sent in said stream reflect transactions executed by said leader that change database data in said replication unit;
said leader storing LCRs in said stream in a persistent Raft log;
determining whether a lagging follower of said plurality of followers meets one or more criteria for detaching said lagging follower as a subscriber of said in-memory queue; and
in response to determining that said lagging follower meets said one or more criteria for detaching said lagging follower, detaching said lagging follower from said in-memory queue, wherein determining whether a lagging follower of said plurality of followers meets one or more criteria for detaching comprises at least one of:
determining whether a number of LCRs in said in-memory queue, which are not yet read by said lagging follower but have been read by one or more other followers of said plurality of followers, is greater than a threshold number, or
determining whether the lagging follower has remained behind reading LCRs from said in-memory queue for at least a threshold period of time.

2. The method of claim 1, further including said lagging follower reading LCRs from said persistent Raft log in response to detaching said lagging follower.

3. The method of claim 2, wherein determining whether a lagging follower of said plurality of followers meets one or more criteria for detaching includes determining there are sufficient followers for consensus without said lagging follower.

4. The method of claim 1, further including:
said leader storing in a commit queue records indicating a number of pending commits; sending an indication of said number of pending commits to a particular follower of said plurality of followers; and
said particular follower flushing to persistent storage a batch of LCRs from another in memory queue for said particular follower based on said indication of said number of pending commits.

5. The method of claim 1, further including:
in response to a particular follower of said plurality of followers determining that the particular follower has not received a post-commit LCR for a database transaction after a threshold period of time, said particular follower invoking a remote procedure call to obtain an outcome for said database transaction; and
said particular follower committing or rolling back a corresponding apply database transaction based on the outcome.

6. The method of claim 1, wherein:
wherein a particular LCR in said stream specifies a change to a plurality of columns in a database table; and
wherein for each column of said plurality of columns, said particular LCR includes a hash value in lieu of a column name of said each column, said hash value being calculated according to a hash algorithm.

7. The method of claim 1, wherein:
said leader runs on a first shard server that hosts a plurality of leaders that includes said leader, and said followers of said plurality of leaders run a respective shard server of a plurality of shard servers;
each leader of said plurality of leaders stores respective liveness data in a shared memory area of said shard server; and
a single process on said first shard server sending to each shard server of said plurality of shard servers a consolidated heartbeat message that consolidates liveness data stored by each leader of said plurality of leaders in said shared memory area.

8. The method of claim 1, wherein during a failover for the replication group in which a follower of said plurality of followers becomes a new leader, on said lagging follower:
a network receiver receiving a stream of LCRs from the new leader;
said network receiver storing the stream of LCRs to a local persistently stored local Raft log of said lagging follower; and
in lieu of receiving said stream of LCRs from said network receiver, an apply process of said lagging follower reading a stream of LCRs from said local Raft log to apply.

9. The method of claim 8, after completing said failover, said network receiver forwarding LCRs to said apply process.

10. The method of claim 1, wherein in response said leader determining that a file of said Raft log selected for writing a set of LCRs includes a minimum required log index for said plurality of followers, said leader waiting to write said set of LCRs at least until said file no longer includes said minimum required log index.

11. One or more non-transitory storage media storing sequences of instructions that, when executed by one or more computing devices, cause:
within a replication group that replicates a replication unit of a database, a leader for said replication unit sending via an in-memory queue a stream of LCRs (Logical Change Record) to a plurality of followers for said replication unit, wherein LCRs sent in said stream reflect transactions executed by said leader that change database data in said replication unit;
said leader storing LCRs in said stream in a persistent Raft log;
determining whether a lagging follower of said plurality of followers meets one or more criteria for detaching said lagging follower as a subscriber of said in-memory queue; and
in response to determining that said lagging follower meets said one or more criteria for detaching said lagging follower, detaching said lagging follower from said in-memory queue, wherein determining whether a lagging follower of said plurality of followers meets one or more criteria for detaching comprises at least one of:
determining whether a number of LCRs in said in-memory queue, which are not yet read by said lagging follower but have been read by one or more other followers of said plurality of followers, is greater than a threshold number, or
determining whether the lagging follower has remained behind reading LCRs from said in-memory queue for at least a threshold period of time.

12. The one or more non-transitory storage media of claim 11, wherein the one or more sequences of instructions include instructions, that when executed by one or more computing devices, cause said lagging follower reading LCRs from said persistent Raft log in response to detaching said lagging follower.

13. The one or more non-transitory storage media of claim 12, wherein determining whether a lagging follower of said plurality of followers meets one or more criteria for detaching includes determining there are sufficient followers for consensus without said lagging follower.

14. The one or more non-transitory storage media of claim 11, wherein the one or more sequences of instructions include instructions, that when executed by one or more computing devices, cause:
said leader storing in a commit queue records indicating a number of pending commits; sending an indication of said number of pending commits to a particular follower of said plurality of followers; and
said particular follower flushing to persistent storage a batch of LCRs from another in-memory queue for said particular follower based on said indication of said number of pending commits.

15. The one or more non-transitory storage media of claim 11, wherein the one or more sequences of instructions include instructions, that when executed by one or more computing devices, cause:
in response to a particular follower of said plurality of followers determining that the particular follower has not received a post-commit LCR for a database transaction after a threshold period of time, said particular follower invoking a remote procedure call to obtain an outcome for said database transaction; and
said particular follower committing or rolling back a corresponding apply database transaction based on the outcome.

16. The one or more non-transitory storage media of claim 11, wherein the one or more sequences of instructions include instructions, that when executed by one or more computing devices, cause:
wherein a particular LCR in said stream specifies a change to a plurality of columns in a database table; and
wherein for each column of said plurality of columns, said particular LCR includes a hash value in lieu of a column name of said each column, said hash value being calculated according to a hash algorithm.

17. The one or more non-transitory storage media of claim 11, wherein:
said leader runs on a first shard server that hosts a plurality of leaders that includes said leader, and said followers of said plurality of leaders run a respective shard server of a plurality of shard servers;

each leader of said plurality of leaders stores respective liveness data in a shared memory area of said shard server; and a single process on said first shard server sending to each shard server of said plurality of shard servers a consolidated heartbeat message that consolidates liveness data stored by each leader of said plurality of leaders in said shared memory area.

18. The one or more non-transitory storage media of claim 11, wherein during a failover for the replication group in which a follower of said plurality of followers becomes a new leader, on said lagging follower:

a network receiver receiving a stream of LCRs from the new leader;

said network receiver storing the stream of LCRs to a local persistently stored local Raft log of said lagging follower; and in lieu of receiving said stream of LCRs from said network receiver, an apply process of said lagging follower reading a stream of LCRs from said local Raft log to apply.

19. The one or more non-transitory storage media of claim 18, wherein the one or more sequences of instructions include instructions, that when executed by one or more computing devices, cause after completing said failover, said network receiver forwarding LCRs to said apply process.

20. The one or more non-transitory storage media of claim 11, wherein in response said leader determining that a file of said Raft log selected for writing a set of LCRs includes a minimum required log index for said plurality of followers, said leader waiting to write said set of LCRs at least until said file no longer includes said minimum required log index.

21. A data processing system, comprising:

a database implemented on one or more computing devices;

a replication group that replicates a replication unit of the database;

a leader for said replication unit sending, via an in-memory queue, a stream of LCRs (Logical Change Record) to a plurality of followers for said replication unit, wherein:

LCRs sent in said stream reflect transactions executed by said leader that change database data in said replication unit, said leader stores LCRs in said stream in a persistent Raft log, and the computing system comprises a processor and a memory coupled to the processor, wherein the memory comprises instructions that are executed by the processor to cause the processor to execute the process comprising:

determining whether a lagging follower of said plurality of followers meets one or more criteria for detaching said lagging follower as a subscriber of said in-memory queue; and in response to determining that said lagging follower meets said one or more criteria for detaching said lagging follower, detaching said lagging follower from said in-memory queue, wherein determining whether a lagging follower of said plurality of followers meets one or more criteria for detaching comprises at least one of:

determining whether a number of LCRs in said in-memory queue, which are not yet read by said lagging follower but have been read by one or more other followers of said plurality of followers, is greater than a threshold number, or determining whether the lagging follower has remained behind reading LCRs from said in-memory queue for at least a threshold period of time.

22. The data processing system of claim 21, further including said lagging follower reading LCRs from said persistent Raft log in response to detaching said lagging follower.

23. The data processing system of claim 22, wherein determining whether a lagging follower of said plurality of followers meets one or more criteria for detaching includes determining there are sufficient followers for consensus without said lagging follower.

24. The data processing system of claim 1, further including:

said leader storing in a commit queue records indicating a number of pending commits;

sending an indication of said number of pending commits to a particular follower of said plurality of followers; and said particular follower flushing to persistent storage a batch of LCRs from another in memory queue for said particular follower based on said indication of said number of pending commits.

* * * * *